United States Patent
Nagai et al.

(10) Patent No.: US 11,345,853 B2
(45) Date of Patent: May 31, 2022

(54) HYDROPHILIZATION TREATMENT METHOD OF POLYPHENYLEN SULFIDE RESIN

(71) Applicant: KURITA WATER INDUSTRIES LTD., Tokyo (JP)

(72) Inventors: Tatsuo Nagai, Tokyo (JP); Yuzuki Yamamoto, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 16/760,035

(22) PCT Filed: Sep. 14, 2018

(86) PCT No.: PCT/JP2018/034103
§ 371 (c)(1),
(2) Date: Apr. 28, 2020

(87) PCT Pub. No.: WO2019/087587
PCT Pub. Date: May 9, 2019

(65) Prior Publication Data
US 2020/0347298 A1    Nov. 5, 2020

(30) Foreign Application Priority Data
Oct. 31, 2017 (JP) .............................. JP2017-210279

(51) Int. Cl.
*C09K 13/04* (2006.01)
*C23C 18/24* (2006.01)
(Continued)

(52) U.S. Cl.
CPC .............. *C09K 13/04* (2013.01); *C23C 18/24* (2013.01); *C25B 1/30* (2013.01); *C25B 11/043* (2021.01)

(58) Field of Classification Search
CPC .......... C09K 13/04; C25B 11/043; C25B 1/30; C23C 18/24; C23C 18/32; C23C 18/1653;
(Continued)

(56) References Cited

U.S. PATENT DOCUMENTS 3,597,336 A * 8/1971 Shotton et al. ........ C23C 18/206
205/50
8,323,769 B2 * 12/2012 Kuhr .................... C23C 18/1893
428/137
2011/0143110 A1 * 6/2011 Tsuchiya ................. B29C 70/08
428/213

FOREIGN PATENT DOCUMENTS

| JP | S63121669 | 5/1988 |
| JP | 2002121678 | 4/2002 |

(Continued)

OTHER PUBLICATIONS

"International Search Report (Form PCT/ISA/210) of PCT/JP2018/034103", dated Oct. 16, 2018, with English translation thereof, pp. 1-2.

*Primary Examiner* — Duy Vu N Deo
(74) *Attorney, Agent, or Firm* — JCIPRNET

(57) ABSTRACT

A treatment device 1 includes: a treatment tank 2; an electrolytic cell 6 including diamond electrodes continuous from a pipe 4 including a circulation pump 5; and a pipe 7 supplying from the electrolytic cell 6 to the treatment tank 2. The treatment tank 2 and the electrolytic cell 6 are filled with sulfuric acid having a predetermined concentration; current is applied to the electrolytic cell 6 to electrolyze the sulfuric acid and a persulfuric acid solution S is generated by electrolyzing the sulfuric acid; and the persulfuric acid solution S is supplied to the treatment tank 2 through the pipe 7. Besides, inside the treatment tank 2, a PPS resin
(Continued)

board 8 is vertically suspended in a state of being fixed to a fixture 8A, and the PPS resin board 8 is treated by the persulfuric acid solution S.

4 Claims, 1 Drawing Sheet

(51) Int. Cl.
  *C25B 1/30* (2006.01)
  *C25B 11/043* (2021.01)
(58) Field of Classification Search
  CPC . C23C 18/2093; C23C 18/2086; C23C 18/30; C08J 2381/04; C08J 7/14; C25D 3/38; C25D 5/56
  USPC .............................................. 216/83; 438/745
  See application file for complete search history.

(56) References Cited

FOREIGN PATENT DOCUMENTS

| | | |
|---|---|---|
| JP | 2008031513 | 2/2008 |
| JP | 2012052214 | 3/2012 |
| JP | 2012215462 | 11/2012 |
| JP | 2015518083 | 6/2015 |

\* cited by examiner

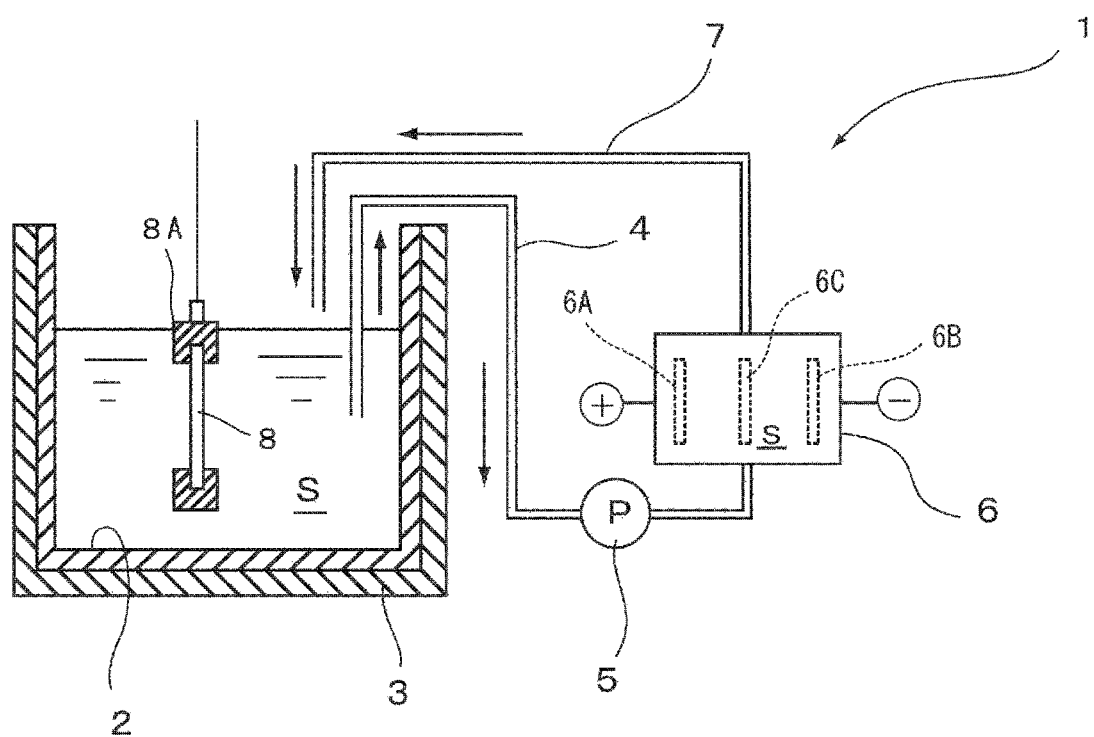

HYDROPHILIZATION TREATMENT METHOD OF POLYPHENYLEN SULFIDE RESIN

CROSS-REFERENCE TO RELATED APPLICATION

This application is a 371 application of the international PCT application serial no. PCT/JP2018/034103, filed on Sep. 14, 2018, which claims the priority benefit of Japan application no. 2017-210279, filed on Oct. 31, 2017. The entirety of each of the abovementioned patent applications is hereby incorporated by reference herein and made a part of this specification.

BACKGROUND OF THE INVENTION

Technical Field

The present invention relates to a hydrophilization treatment method of polyphenylen sulfide resin (hereinafter, may be referred to PPS resin) suitably used as plating pre-treatment of PPS resin.

Related Art

Plastic has substituted for metal in a member in which metal is used as a structure material or a component material, taking advantage of light weight, low cost, freedom of shape, ease of mass production and the like. Presently, plastic is widely used not only for decoration but also for exterior or interior components of automobiles, home appliances and the like. At this time, in order to improve rigidity, wear resistance, weather resistance, heat resistance and the like, plating is performed on a plastic surface in many cases.

Because plastic is non-conductive, it is necessary to first form a metal film serving as a conductor on the plastic before plating. The methods can be broadly categorized into dry methods such as CVD (chemical vapour deposition) and PVD (physical vapour deposition) and a wet method of electroless nickel plating. Because the dry methods are mostly used for film formation in a vacuum state and are not suitable for application to mass production or large components, the wet method has been adopted so far.

The PPS resin is a high-performance resin material which not only has high heat resistance with a melting point of about 280° C., but also achieves excellent chemical resistance and self-extinguishing properties without adding a flame retardant, and thus PPS resin is widely used as the plastic being a substitute for metal. The PPS resin is used as engineering plastic and mainly substitutes for metal and thermosetting resin in various fields such as exhaust gas treatment valves and carburettors in automobile components and connectors and various switches in electric and electronic components.

A hydrophilization treatment before plating of a plastic molded product made of this PPS resin may be a chromic acid treatment, but the chromic acid has weak oxidizing power, and thus the PPS resin surface having excellent chemical resistance is difficult to be made hydrophilic. In addition, as an environmentally-friendly technology which replaces chromic acid, patent literature 1 describes etching performed with a mixed solution of permanganate and inorganic salt. Furthermore, patent literature 2 and patent literature 3 disclose a pre-treatment method for electroless plating in which the surface of a plastic molded product is roughened using ozone-dissolved water.

LITERATURE OF RELATED ART

Patent Literature

Patent literature 1: Japanese Patent Laid-Open 2008-31513
Patent literature 2: Japanese Patent Laid-Open 2002-121678
Patent literature 3: Japanese Patent Laid-Open 2012-52214

SUMMARY

Problems to be Solved

However, in the method of etching with the mixed solution of permanganate and inorganic salt described in patent literature 1, there is a problem that the PPS resin is difficult to be made hydrophilic and has poor adhesion to metal. In addition, in the plating pre-treatment method of a plastic surface described in patent literature 2 and patent literature 3, the PPS resin is difficult to be made hydrophilic. In addition, because ozone decomposes at a high rate, ozone water having a high concentration must be manufactured and the high concentration must be maintained. Therefore, there is a problem that not only large-scale equipment is required, unevenness is also likely to occur in treatment due to a local difference in the ozone concentration.

The present invention is completed in view of the above problems and provides a hydrophilization treatment method of PPS resin which is used as plating pre-treatment of a chromium- and manganese-free PPS resin surface and can form plating sufficiently adhered to the PPS resin surface.

[Means to Solve Problems]

The present invention provides a hydrophilization treatment method of polyphenylen sulfide resin, treating a surface of polyphenylen sulfide resin by a solution with sulfuric acid electrolyzed therein (Invention 1).

According to the invention (Invention 1), due to a strong oxidizing action of persulfuric acid generated by electrolyzing the sulfuric acid, the PPS resin surface is slightly dissolved and roughened and hydrophilic functional groups are exposed. Therefore, the plating sufficiently adhesive can be obtained by performing plating treatment after the hydrophilization treatment.

In the above invention (Invention 1), a sulfuric acid concentration of the solution is preferably 60-90 wt % (Invention 2).

According to the invention (Invention 2), the degree of the treatment of the PPS resin surface can be adjusted by adjusting the sulfuric acid concentration.

In the above inventions (Invention 1 and 2), a temperature of the hydrophilization treatment is preferably 20-70° C. (Invention 3).

According to the invention (Invention 3), decomposition of the persulfuric acid can be suppressed and the PPS resin surface can be suitably made hydrophilic.

In the above inventions (Inventions 1-3), a persulfuric acid concentration of the solution is preferably 3 g/L or higher (Invention 4).

According to the invention (invention 4), the PPS resin surface can be suitably roughened by the strong oxidizing action of the persulfuric acid to expose the hydrophilic functional groups, and the plating particularly adhesive can be obtained by performing the plating treatment after the hydrophilization treatment.

Effect

According to the hydrophilization treatment method of polyphenylen sulfide resin of the present invention, the polyphenylen sulfide resin surface is dissolved and roughened by the strong oxidizing action of the persulfuric acid, and the hydrophilic functional groups are exposed. Therefore, the plating sufficiently adhesive can be obtained by performing the plating treatment after the hydrophilization treatment.

BRIEF DESCRIPTION OF THE DRAWINGS

FIG. 1 is a schematic view showing a treatment device to which a hydrophilization treatment method of PPS resin according to an embodiment of the present invention can be applied.

DESCRIPTION OF THE EMBODIMENTS

FIG. 1 shows a treatment device suitable for performing a hydrophilization treatment method of PPS resin according to an embodiment of the present invention. In FIG. 1, a treatment device 1 includes: a treatment tank 2 in which a constant temperature heater 3 is arranged on an outer circumference; an electrolytic cell 6 continuous from a pipe 4 including a circulation pump 5; and a pipe 7 supplying from the electrolytic cell 6 to the treatment tank 2. Inside the electrolytic cell 6, arranged are an anode 6A and a cathode 6B made of diamond electrodes, and a bipolar electrode 6C disposed between the anode 6A and the cathode 6B. Moreover, a stirring part with a liquid circulation function for stirring liquid may be disposed inside the treatment tank 2.

In the treatment device 1, the treatment tank 2 and the electrolytic cell 6 are filled with sulfuric acid having a predetermined concentration in an initial state, and a predetermined current is applied from a DC power supply unit to the anode 6A and the cathode 6B to electrolyze the sulfuric acid. Thereby, a sulfuric acid solution (hereinafter, referred to as a persulfuric acid solution in the specification) S including persulfuric acid (oxidizing agent) such as peroxodisulfuric acid and the like is generated, and the persulfuric acid solution S can be supplied to the treatment tank 2 through the pipe 7. The persulfuric acid solution S is recirculated by the circulation pump 5 from the treatment tank 2 to the electrolytic cell 6 through the pipe 4, and thereby the persulfuric acid solution S is circulated. Besides, inside the treatment tank 2, a PPS resin board 8 which is a treatment target is vertically suspended in a state of being fixed to a fixture 8A.

The persulfuric acid solution S preferably has a sulfuric acid concentration of 60-90 wt %, and particularly 70-80 wt %. If the sulfuric acid concentration is lower than 60 wt %, the sulfuric acid concentration of the obtained persulfuric acid solution S is too low, hydrophilic groups cannot be sufficiently exposed on the surface of the PPS resin board 8, and an effect of improving adhesion of the plating is not sufficiently obtained. On the other hand, even if the sulfuric acid concentration is higher than 90 wt %, no further improvement in the effect can be obtained and the handling property is also deteriorated, which is not preferable.

Next, the hydrophilization treatment method of PPS resin using the treatment device 1 mentioned above is described. First, after sulfuric acid is put into the treatment tank 2 and heated by the constant temperature heater 3, the sulfuric acid is supplied to the electrolytic cell 6 by the circulation pump 5, and a predetermined current is applied from the DC power supply unit to electrolyze the sulfuric acid. Thereby, the persulfuric acid solution S including peroxodisulfuric acid and the like is generated, and the persulfuric acid solution S is supplied to the treatment tank 2 through the pipe 7 and is circulated.

At this time, in order that the temperature of the persulfuric acid solution S is 20-70° C., and particularly room temperature to 50° C., the persulfuric acid solution S is preferably heated by the constant temperature heater 3 as necessary. If the temperature of the persulfuric acid solution S is lower than 20° C., the hydrophilic groups cannot be sufficiently exposed on the surface of the PPS resin board 8, and the effect of improving adhesion of the plating is not sufficiently obtained. On the other hand, if the temperature is higher than 70° C., the PPS resin surface is excessively deteriorated, and the adhesion of the plating is reduced instead.

In addition, the electrolysis of the sulfuric acid in the electrolytic cell 6 may be performed under conditions that the concentration of the persulfuric acid such as peroxodisulfuric acid and the like generated by the electrolysis is 3 g/L or higher, and particularly 3-20 g/L. If the persulfuric acid concentration is lower than 3 g/L, the effect of sufficiently improving adhesion of the plating is not obtained. On the other hand, even if the persulfuric acid concentration is higher than 20 g/L, not only the above effect is not improved, but it is also uneconomical.

Then, when the persulfuric acid solution S inside the treatment tank 2 reaches the above temperature and persulfuric acid concentration, the surface of the PPS resin board 8 is treated by immersing the PPS resin board 8 which has been degreased into the treatment tank 2. At this time, in order to suppress air bubbles adhered when the PPS resin board 8 is immersed in the persulfuric acid solution S, a wet treatment is preferably applied in advance on the PPS resin board 8.

The PPS resin board 8 is immersed in the persulfuric acid solution S inside the treatment tank 2 for 5-20 minutes, and thereby the surface of the PPS resin board 8 is dissolved and roughened, and the hydrophilic functional groups are exposed. Accordingly, the adhesion of plating can be improved in the subsequent plating treatment. Moreover, although the persulfuric acid concentration of the persulfuric acid solution S inside the treatment tank 2 gradually decreases, the persulfuric acid solution S is circulated between the electrolytic cell 6 and the treatment tank 2, persulfuric acid is generated in the electrolytic cell 6 and the persulfuric acid concentration of the persulfuric acid solution S is recovered, and thereby the treatment can be continuously performed.

In the above process, after the functional groups appearing on the resin surface of the PPS resin board 8 are activated, neutralization-reduction treatment, conditioning treatment and the like may be performed as necessary. Furthermore, plating is performed after washing with water. In a method for plating treatment, first, electroless nickel plating with autocatalytic properties is deposited, and then plating of electrolytic nickel, electrolytic chromium, or the like is performed. Metal for the electroless plating may be any of nickel, copper and the like, and metal for the electrolytic plating may be any of nickel, chromium, copper, cobalt, alloys thereof and the like. Thereby, a plated product of PPS resin in which the surface of the PPS resin board 8 is plated with nickel or the like having good adhesion can be obtained.

In the above, the hydrophilization treatment method of PPS resin of the present invention is described based on the embodiment, but the present invention is not limited to the implementation example, and various modifications can be made. For example, the present invention can be applied to continuous treatment instead of batch treatment like the embodiment. In addition, it is needless to say that the PPS resin is not limited to being applied to a board as in the embodiment and can be applied to molded articles of various shapes.

IMPLEMENTATION EXAMPLE

The present invention is more specifically described using implementation examples and a comparison example below. However, the present invention is not limited to description of the implementation examples and the comparison example. Moreover, in the implementation examples and the comparison example below, the persulfuric acid concentration measurement and adhesion test are performed as follows.

<Persulfuric Acid Concentration Measurement Method>

First, the concentration of the total oxidizing agent included in the treatment solution (the persulfuric acid solution S) is measured by iodine titration. In the iodine titration, potassium iodide (KI) is added to the persulfuric acid solution S to release iodine ($I_2$), the $I_2$ is titrated with a standard solution of sodium thiosulphate to obtain the amount of $I_2$, and the oxidizing agent concentration is obtained from the amount of $I_2$. Next, the concentration of only the hydrogen peroxide of the persulfuric acid solution S is obtained by potassium permanganate titration, and the persulfuric acid concentration is calculated by subtracting the potassium permanganate titration value from the iodine titration value.

<Plating Adhesion Test>

According to a flow shown in Table 1 below, the plating treatment is performed on the PPS resin board 8 which is made hydrophilic with the persulfuric acid solution S, and a sample for the adhesion test is obtained.

<Treatment Tank>
Volume of the treatment tank 2: 40 L
Size of the PPS resin board 8: 500 mm×500 mm×thickness of 5 mm
<Electrolytic Cell 6 and Electrolysis Conditions for Generating Persulfuric Acid>
Cell volume: 0.5 L
Anode and cathode: diamond electrode (diameter of 150 mm)
Bipolar electrode material: the same as the anode and the cathode
Current density: 50 A/dm$^2$
Liquid circulation rate: 52 L/hr
<Hydrophilization Treatment Conditions>
Sulfuric acid concentration: 75 wt %
Persulfuric acid concentration: 10 g/L
Treatment temperature: 30° C.
Treatment time: 10 minutes First, the PPS resin board 8 is immersed in a wet treatment tank with a surfactant therein for 10 minutes. Then, the PPS resin board 8 is taken out from the treatment tank 2 and washed with tap water after being immersed in the treatment tank 2 filled with the persulfuric acid solution S for 10 minutes to be made hydrophilic. Subsequently, electroless nickel plating is performed by the process shown in Table 1. Thereafter, copper sulphate plating is finally performed. Then, the adhesion strength of the plating film of the PPS resin board 8 plated with copper sulphate is measured. Results are shown in Table 2 along with hydrophilization treatment conditions.

Implementation Examples 2-7

Except that various settings of the conditions for electrolyzed sulfuric acid treatment are changed as shown in Table 2, chromium plating is performed similarly to Implementation example 1, and adhesion of the plating is evaluated. Results are shown in Table 2 along with hydrophilization treatment conditions.

TABLE 1

| Process name | Composition | Concentration | Treatment temperature | Treatment time |
| --- | --- | --- | --- | --- |
| Alkali treatment | NaOH | 50 g/L | 45° C. | 3 minutes |
| Conditioner | CC231*[1] | 10% | 45° C. | 2 minutes |
| Catalysis | PdCl$_2$ | 0.3 g/L | 45° C. | 2 minutes |
| Facilitation | NaH$_2$PO$_2$•H$_2$O | 35 g/L | 45° C. | 1 minute |
| Electroless Ni—P plating | SA-98-LF*[2] | 150 mL/L | 45° C. | 5 minutes |
| Heat treatment | — | — | 150° C. | 30 minutes |
| Copper sulphate plating*[3] | Cu$_2$SO$_4$•5H$_2$O | 250 g/L | 25° C. | 40 minutes |
| Heat treatment | — | — | 150° C. | 30 minutes |

*[1]CC231: trade name, manufactured by Rohm & Hass Electronic Material Co., Ltd.
*[2]SA-98-LF: trade name, manufactured by Okuno. Co., Ltd.
*[3]Thickness is formed to about 20 μm.

With respect to the obtained samples for the adhesion test, adhesive strength of the plating film is measured as a peel test according to the adhesion test method specified in "decorative electroplating on plastic" in JIS H8630.

Implementation Example 1

The surface treatment of the PPS resin board 8 is performed using the device shown in FIG. 1. Specifications and conditions of the treatment tank are as follows.

Comparison Example 1

Except that a sulfuric acid solution with a sulfuric acid concentration of 75 wt % is used in place of the persulfuric acid solution, chromium plating is performed similarly to Implementation example 1, and adhesion of the plating is evaluated. Results are shown in Table 2 along with treatment conditions.

TABLE 2

| Example No. | Sulfuric acid concentration (wt %) | Treatment temperature (° C.) | Persulfuric acid concentration (g/L) | Treatment time (minute) | Adhesion strength (kN/m) |
|---|---|---|---|---|---|
| Implementation example 1 | 75 | 30 | 10 | 10 | 1.2 |
| Implementation example 2 | 65 | 40 | 5 | 20 | 1.0 |
| Implementation example 3 | 85 | 50 | 3 | 5 | 0.9 |
| Implementation example 4 | 65 | 80 | 5 | 15 | 0.6 |
| Implementation example 5 | 55 | 70 | 10 | 20 | 0.5 |
| Implementation example 6 | 75 | 40 | 10 | 3 | 0.6 |
| Implementation example 7 | 85 | 20 | 2 | 20 | 0.5 |
| Comparison example 1 | 75 | 30 | 0 | 10 | 0.3 |

As is clear from Table 2, according to the hydrophilization treatment method of PPS resin of Implementation examples 1-7, by performing plating on the PPS resin board 8 after treatment, the adhesion strength of 0.5 kN/m or greater is obtained. Particularly, in Implementation examples 1-3 in which the treatment is performed at a treatment temperature of 50° C. or lower and a persulfuric acid concentration of 3 g/L or higher for a sufficient time of, for example, 5 minutes or longer, the adhesion strength of 0.9 kN/m or greater is obtained. By comparing Implementation examples 4 and 5 and Implementation examples 1-3, it is known that if the temperature is 70° C. or higher, adhesion strength is reduced instead. On the other hand, in Comparison example 1 in which the treatment is performed with sulfuric acid having a concentration of 75 wt % and not including persulfuric acid, even if plating is performed on the PPS resin board 8 after the treatment, the adhesion strength is as low as 0.3 kN/m.

REFERENCE SIGNS LIST

1 treatment device
2 treatment tank
3 constant temperature heater
4 pipe
5 circulation pump
6 electrolytic cell
6A anode
6B cathode
6C bipolar electrode
7 pipe
8 PPS resin board
S persulfuric acid solution

What is claimed is:

1. A hydrophilization treatment method of polyphenylen sulfide resin, consisting of:
    treating a surface of polyphenylen sulfide resin by a solution with sulfuric acid electrolyzed therein for 15-20 minutes,
    wherein the solution includes persulfuric acid; and
    washing the treated surface of polyphenylen sulfide resin with water.

2. The hydrophilization treatment method of polyphenylen sulfide resin according to claim 1, wherein a sulfuric acid concentration of the solution is 60-90 wt %.

3. The hydrophilization treatment method of polyphenylen sulfide resin according to claim 1, wherein a temperature of the hydrophilization treatment is 20-70° C.

4. The hydrophilization treatment method of polyphenylen sulfide resin according to claim 1, wherein a persulfuric acid concentration of the solution is 3 g/L or higher.

* * * * *